United States Patent [19]

Wallace et al.

[11] 3,759,105

[45] Sept. 18, 1973

[54] METHOD AND APPARATUS FOR SAMPLING GROUND MEAT

[75] Inventors: Charles H. Wallace, Carrollton, Va.; Frank L. Smith, Toledo, Ohio

[73] Assignee: Huss Equipment Corporation, Toledo, Ohio

[22] Filed: June 18, 1971

[21] Appl. No.: 154,443

[52] U.S. Cl. .......................... 73/421 A, 241/101 R
[51] Int. Cl. ............................................. G01n 1/02
[58] Field of Search ........................... 146/182, 183; 73/421 R, 422 R, 423 R, 424; 241/101 R

[56] References Cited
UNITED STATES PATENTS
1,840,455  1/1932  Lea .................................... 73/421 R
1,862,250  6/1932  Anderson ............................. 73/424

*Primary Examiner*—S. Clement Swisher
*Attorney*—Allen D. Gutchess, Jr.

[57] ABSTRACT

This invention relates to a method and apparatus for continuously sampling a ground meat product. Government restrictions on fat content in ground meat now necessitate more frequent sampling of the ground meat product at the processing plant. Heretofore, such samples have been taken periodically from the meat being processed and tested in a fat analyzer. The present invention continuously takes a sample portion of meat from the meat processing equipment and continuously conveys it to the fat analyzing equipment. By obtaining a continuous sample of the ground meat, a more accurate or representative analysis can be obtained. Further, less labor is involved in obtaining and analyzing the samples. The analyses can also be made more rapidly and corrective action, if needed, taken sooner. To obtain a continuous sample, a small conveyor with a variable entrance opening is positioned under a discharge spout of a meat grinder of the processing equipment and continuously receives and conveys a small portion of the ground meat exiting from the spout of the grinder. This meat is carried to one side where it can be further processed and the fat determination made.

10 Claims, 3 Drawing Figures

INVENTOR.
CHARLES H. WALLACE
BY FRANK L. SMITH

ATTORNEY

INVENTOR.
CHARLES H. WALLACE
FRANK L. SMITH
BY
Allen D. Gutchen, jr
ATTORNEY

INVENTOR.
CHARLES H. WALLACE
BY FRANK L. SMITH
ATTORNEY

METHOD AND APPARATUS FOR SAMPLING GROUND MEAT

This invention relates to a method and apparatus for continuously sampling a ground meat product to determine the fat content thereof.

Fat determination testing of ground meat products has long been used in the meat processing industry but with emphasis now switching from developing formulations that permit maximum fat limits to those that will consistently analyze at about the imposed 30 percent fat limitation now reuired by the government. The thirty percent limitation necessitates that samples of the meat product can be taken more frequently. It is important that the samples be taken rapidly and that the fat determination be made rapidly so that any necessary corrective action in the meat formulation be taken as soon as possible. This enables the fat content of the meat product to be kept closer to the 30 percent requirement than otherwise. It has been estimated that for each percent the fat content of the meat is below the thirty percent limit, the cost to the meat processor is increased about 3 cents per pound. On the other hand, severe penalties can be imposed if the fat content exceeds the 30 percent limit.

In accordance with the invention, a sample of the ground meat product being processed is continuously collected and carried away to one side of the meat processing equipment to a location where the fat determination can be made. This small, continuous sample is more representative of the ground meat product than is a batch sample. The sample also can be quickly taken and the analysis made so that immediate corrective action can be taken for the meat supply used in the product. Further, the labor required for taking the samples is held to a minimum.

In a preferred form, the apparatus used in the sampling includes a cross conveyor having a variable entrance opening located in the path of the ground meat product and of a size to receive a small sample of the product. The conveyor also preferably is driven through a variable speed drive to aid in controlling the quantity of the ground meat product being sampled. The ground meat product sample is then preferably further comminuted prior to the analysis. For this purpose, the sample can be deposited in a small grinder which further grinds the product and an agitator or blender can then receive the product from the small grinder to further emulsify it prior to sampling. A more accurate sample is thereby achieved.

A belt-type conveyor can be used with the sampling equipment, with the conveyor having a smooth belt that is easy to clean and maintain. However, a screw-type conveyor also can be used with the sampling equipment, with the conveyor having a solid one-piece plastic screw which is easy to clean and is more sanitary. Other features of the conveyors will be discussed subsequently.

It is, therefore, a principal object of the invention to provide an improved method and apparatus for taking samples of meat, which method and apparatus have the advantages outlined above.

Other objects and advantages of the invention will be apparent from the following detailed description of a preferred embodiment thereof, reference being made to the accompanying drawings, in which.

Figure 1:
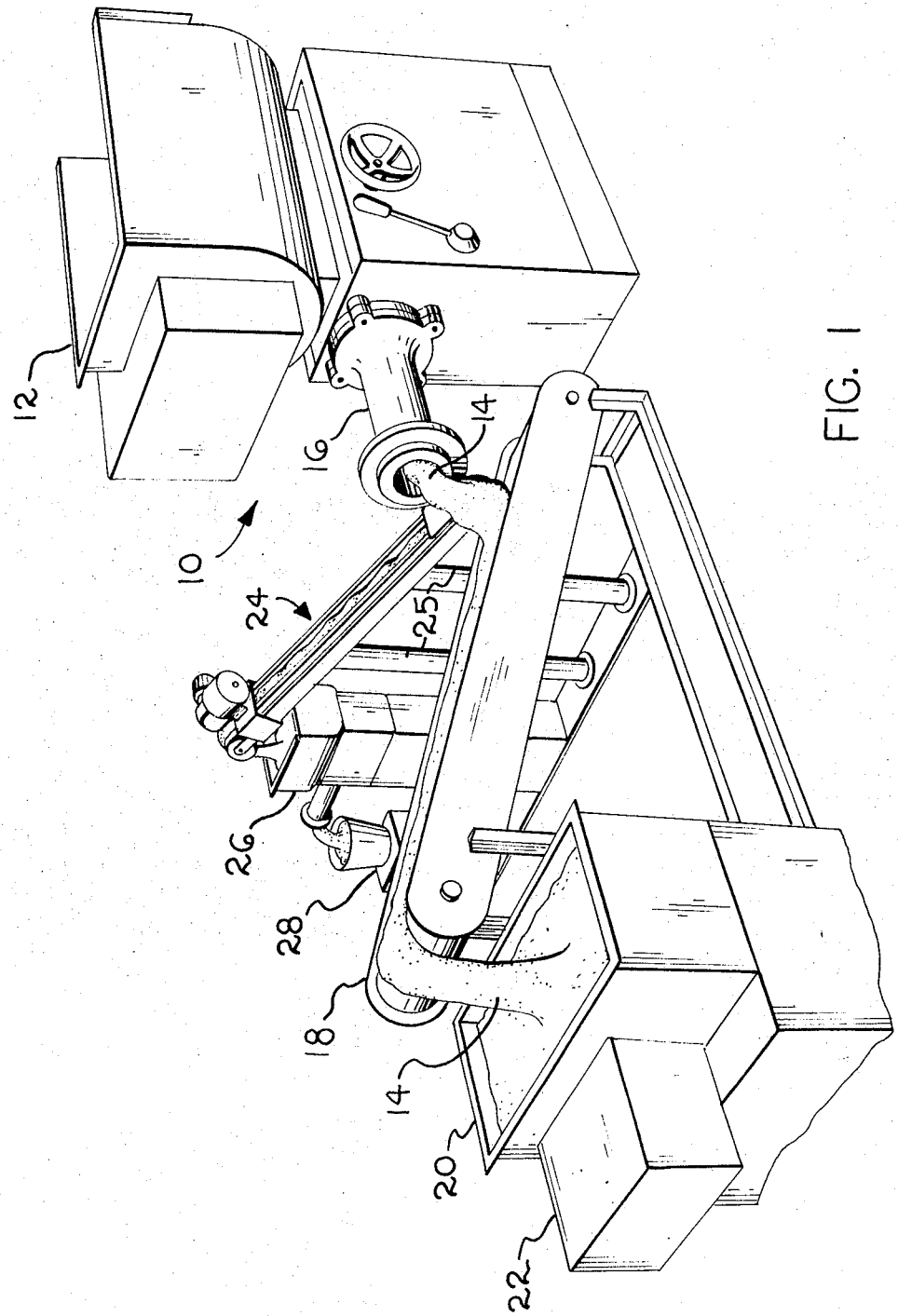
FIG. 1 is a view in perspective of a portion of a meat processing line equipped with sampling apparatus embodying the invention.

Referring to the meat processing line of FIG. 1, a grinder indicated at 10 is a commercially available device. The grinder includes a hopper 12 in which a supply of meat is placed which is to be ground and subsequently formed into patties or otherwise suitably processed. The grinder can be of a variety of types and sizes with a wide range of outputs and available with many different knives and grinding plates to determine the coarseness of the meat product. Ground meat product indicated at 14 is produced by the grinder 10, being discharged from a spout 16.

In this instance, most of the product 14 is carried up an inclined belt conveyor 18 from which it is deposited into a hopper 20 and formed into patties on a machine shown schematically at 22, as is known in the art.

The grinder 10 can have an output up to about twelve thousand pounds per hour, making it important that the ground meat product be held closely to a fat content of thirty percent. If the percentage is above that figure, the meat might have to be re-processed or other penalties imposed. If the content is below that figure, then an excessive cost to the meat processor results. Hence, the analysis of this meat product must be made quickly and accurately.

A continuous, small sample of the meat product 14 is received by a sampling conveyor 24 and carried to one side of the meat processing line. The conveyor 24 is supported on pedestals 25 and has the charge end partially positioned in the path of the product 14. The sample received by the conveyor 24 can be ground further in a small grinder 26 and deposited in a blender 28. This further finely divides and emulsifies the meat product sample. From here, the fat content of the meat can be determined by a commercially available fat analyzer. The conveyor 24 continuously takes away a portion of the meat product 14 so that a representative sample thereof can be obtained. Further, the sample can be quickly supplied to the analyzer so that the fat content can be determined rapidly and any corrections made accordingly. Minimum labor is also involved, only an operator for the analyzer and the sample supplied thereto being required.

Figure 2:
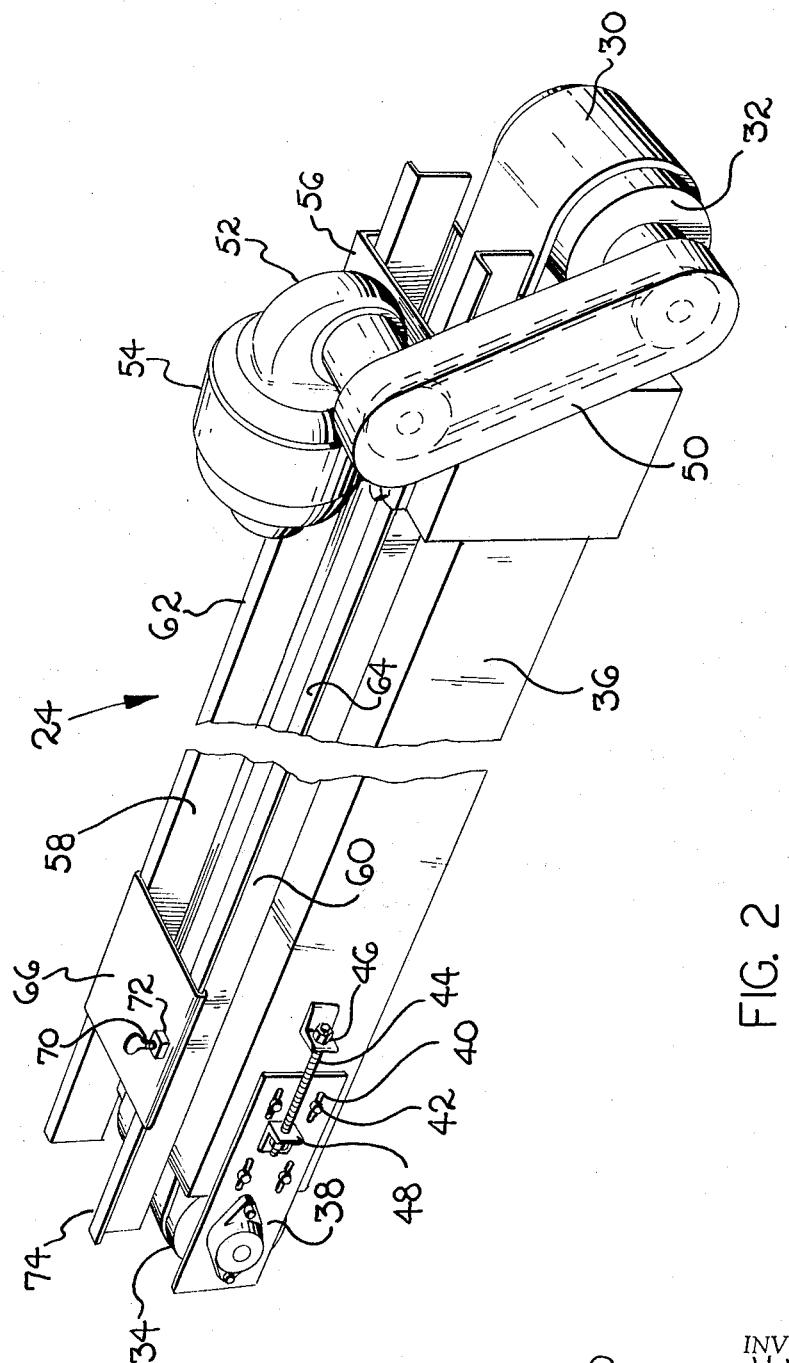
FIG. 2 is an enlarged, fragmentary view in perspective of a sampling conveyor shown in FIG. 1.

The conveyor 24, shown in more detail in FIG. 2, includes a suitable endless belt 30 preferably with a smooth surface so that it is readily cleanable. The belt 30 is mounted around a driven roll 32 at the discharge end and an idler or take-up roll 34 at the charge end. These are rotatably supported by a main frame 36 with the take-up roll being rotatably mounted on take-up plates 38 adjustably affixed to the frame 36 by slots 40 and bolts 42. The position of the plates is controlled by threaded shafts 44 connected to ears 46 and 48 affixed to the main frame 36 and the plates 38, respectively. The drive roll 32 is driven by a belt and pulley arrangement indicated at 50, a variable speed drive 52, and a motor 54 mounted above the frame and the belt on a platform 56.

Elongate guide members 58 and 60 are supported by the frame 36 adjacent the sides of the belt 30 to retain and direct ground meat product which is carried along the belt 30. The guide members 58 and 60 have flanges 62 and 64 along the upper edges thereof on which is mounted an adjustable slide cover 66 having in-turned flanges 68 extending around and under the flanges 62 and 64. A thumb screw 70 is threadedly received in a welded nut 72 on the slide cover 66 and engages the upper surface of the flange 64 when turned downwardly to affix the slide cover 66 at any desired position on the guide members 58 and 60. The slide cover 66 thereby controls the size of a charge or entrance opening indicated at 74 for the belt conveyor, which opening is defined by the forward edge of the slide cover 66 and the charge end portions of the guide members 58 and 60, along with the charge end extremity of the belt 30.

The belt conveyor 24 is positioned relative to the main stream of the ground meat product 14 so as to substantially continuously remove a small, representative part of the meat product from the main stream. The amount so removed is determined by the position of the charge end of the belt 30 relative to the stream of the meat product 14, by the position of the slide cover 66 on the guide members 58 and 60 to control the size of the charge opening 74, and by the speed of the belt 30. Preferably, about one percent of the ground meat product is continuously removed and tested to provide a representative sample of the product. The tested product can be subsequently returned to the main stream of the product 14.

The meat product sample is discharged from the belt 30 directly into the small grinder 26 and then further sub-divided in the blender 28, after which the product is directly tested in a fat analyzer. The analysis is made very shortly after the sample is removed from the main stream of the product 14 so that any corrections required to raise or lower the fat content can be quickly made. Further, as noted above, minimum labor is required to determine the fat content since it is only necessary to remove the sample from the blender 28 and feed it to the fat analyzer. Two or more bowls for the blender 28 can be supplied, with one being substituted for another when the contents of the latter are to be analyzed.

Figure 3:
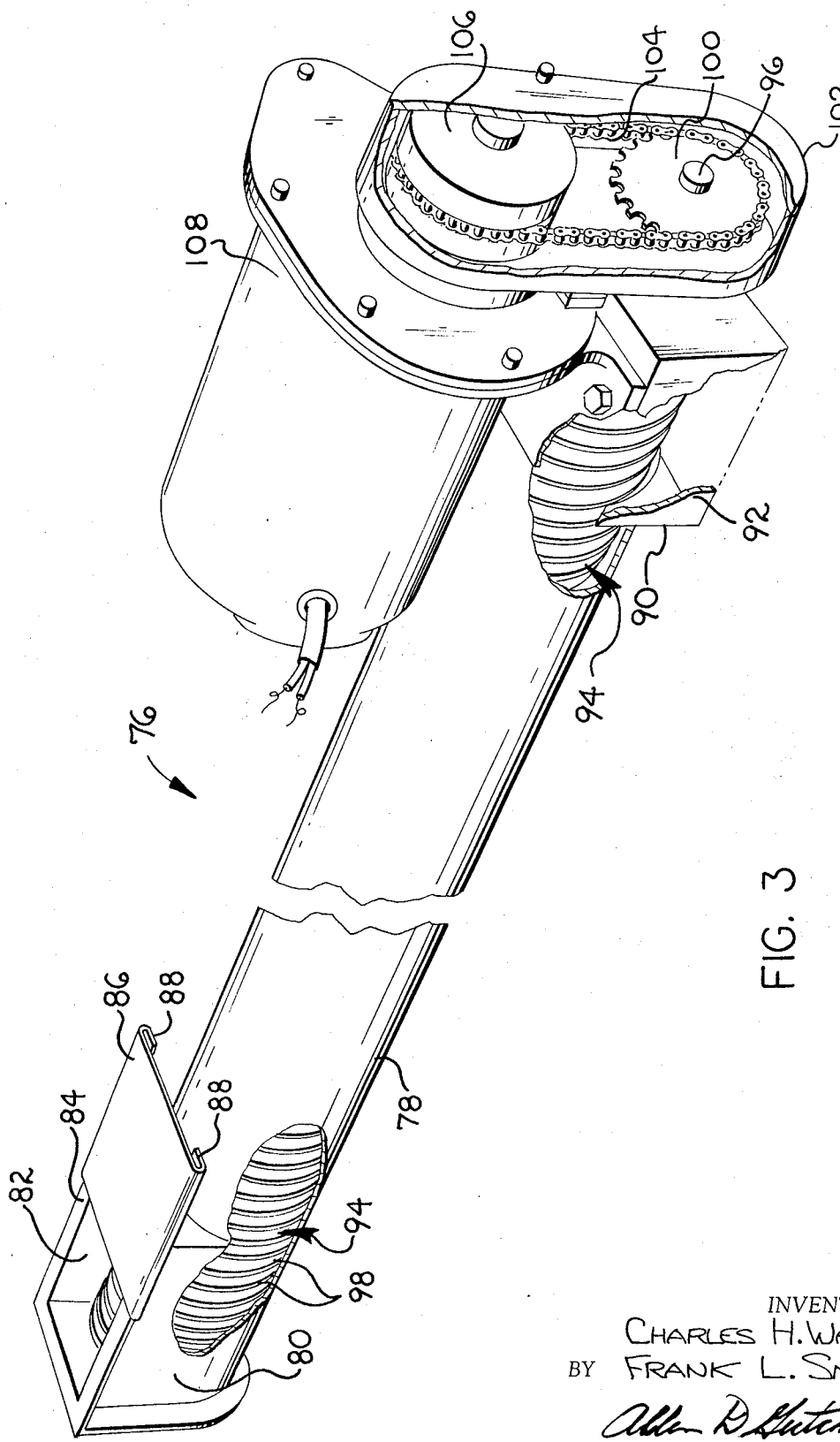
FIG. 3 is an enlarged, fragmentary view in perspective, with parts broken away and with parts in cross section, of a modified sampling conveyor which can be used with the apparatus of FIG. 1.

A modified sampling conveyor 76 is shown in FIG. 3. The conveyor 76 is intended to be used in substantially the same position and in the same manner as the conveyor 24. The conveyor 76 includes a tubular member 78 serving as a supporting frame and having an upwardly extending entrance chute 80 defining a charge or entrance opening 82 having flanges 84 therearound. A cover 86 having inwardly extending flanges 88 is slidably mounted on the side flanges 84 and is movable back and forth to vary the area or size of the charge opening 82. In this manner, the size of the sample received from the ground meat 14 in the processing line can be easily regulated. The opposite end of the tubular member 78 has a downwardly extending discharge chute 90 defining a discharge opening 92.

A conveyor screw 94 extends the length of the tubular member 78. The screw 94, as shown in FIG. 3, has a central shaft 96 and a helical flight 98 extending therealong. The screw 94 and the flight 98 can be integrally made from one piece of plastic material which provides maximum cleanliness for the conveyor 76, there being no junctures or notches in which the meat product can collect and become contaminated.

The shaft 96 of the screw 94 has a driven sprocket 100 mounted thereon in a drive housing 102. The sprocket 100 is driven through a chain 104 and a variable speed drive member 106 by a motor 108. The drive arrangement enables the speed of the screw 94 to be controlled thereby to further aid in determining the size of the sample being drawn from the main meat processing line by the conveyor. Thus, full control over the quantity of the sample is again obtained through the use of the variable charge opening 82 and the variable speed of the screw 94, as well as the position of the conveyor relative to the main stream of the product 14.

Various modifications of the above described embodiments of the invention will be apparent to those skilled in the art and it is to be understood that such modifications can be made without departing from the scope of the invention, if they are within the spirit and the tenor of the accompanying claims.

We claim:

1. In combination, a meat grinder with a discharge spout, a conveyor, means forming an entrance opening for said conveyor, means supporting said conveyor with said entrance opening positioned at least partially under said spout to receive only a small portion of the ground meat discharged from said spout, means for discharging the ground meat portion from another portion of said conveyor, a small grinder under the discharge means and having a hopper to receive ground meat therefrom, said small grinder also having a discharge spout, and means for receiving ground meat discharged from the spout of said small grinder.

2. The combination according to claim 1 characterized further by said means for receiving ground meat from the discharge spout of said small grinder comprises a blender for more fully finely dividing the ground meat from said small grinder discharge spout.

3. The combination according to claim 1 characterized further by said means forming said entrance opening further includes means for changing the size of said entrance opening.

4. The combination according to claim 1 characterized further by variable drive means for driving said conveyor and changing the speed thereof.

5. A method for sampling from a processing line ground meat for fat determination, said method comprising continuously removing a small portion of the ground meat from the processing line, continuously carrying the small portion of ground meat away from the processing line, further comminuting the ground meat portion, and analyzing the ground meat portion to determine the fat content thereof.

6. A method according to claim 5 characterized by said processing line including a meat grinder having a discharge spout, and removing the small portion of the ground meat from under the discharge spout of the grinder.

7. A method according to claim 6 characterized by comminuting the small ground meat portion by supplying it to a grinder and then to a blender prior to analyzing the small ground meat portion.

8. In combination, means for grinding and discharging meat, a conveyor, means forming an entrance opening for said conveyor including means for varying the size of the entrance opening, means supporting said conveyor with said entrance opening positioned to be at least partially in the path of the ground meat to receive only a small portion thereof, means for discharging the ground meat portion from another, portion of said conveyor, means for receiving the ground meat portion from said conveyor, and means for analyzing the ground meat portion to determine the fat content thereof.

9. The combination according to claim 8 characterized by means for further grinding the ground meat portion after being discharged from said conveyor and prior to being analyzed by the analyzing means.

10. The combination according to claim 8 characterized further by said means for varying the size of said entrance opening comprises a cover slidably mounted for transverse movement across said entrance opening.

* * * * *